US009274847B2

(12) United States Patent
Sood

(10) Patent No.: US 9,274,847 B2
(45) Date of Patent: Mar. 1, 2016

(54) RESOURCE MANAGEMENT PLATFORM

(75) Inventor: Vishal Sood, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 2115 days.

(21) Appl. No.: 11/744,663

(22) Filed: May 4, 2007

(65) Prior Publication Data

US 2008/0276243 A1    Nov. 6, 2008

(51) Int. Cl.
*G06F 9/46* (2006.01)
*G06F 9/50* (2006.01)

(52) U.S. Cl.
CPC .......... *G06F 9/5061* (2013.01); *G06F 9/5005* (2013.01); *G06F 2209/508* (2013.01)

(58) Field of Classification Search
None
See application file for complete search history.

(56) References Cited

U.S. PATENT DOCUMENTS

| | | | | |
|---|---|---|---|---|
| 5,805,777 | A * | 9/1998 | Kuchta | 358/1.13 |
| 5,903,728 | A * | 5/1999 | Semenzato | 709/217 |
| 6,167,404 | A * | 12/2000 | Morcos et al. | |
| 6,366,916 | B1 * | 4/2002 | Baer et al. | |
| 6,544,295 | B1 * | 4/2003 | Bodnar | 709/219 |
| 6,789,157 | B1 * | 9/2004 | Lilja et al. | 711/103 |
| 6,892,236 | B1 * | 5/2005 | Conrad et al. | 709/224 |
| 7,096,248 | B2 * | 8/2006 | Masters et al. | 709/201 |
| 7,137,119 | B1 * | 11/2006 | Sankaranarayan et al. | 718/103 |
| 7,254,814 | B1 * | 8/2007 | Cormier et al. | 718/106 |
| 7,644,161 | B1 * | 1/2010 | Graupner et al. | 709/226 |
| 7,908,605 | B1 * | 3/2011 | Graupner et al. | 718/104 |
| 8,024,736 | B1 * | 9/2011 | Graupner et al. | 718/104 |
| 8,826,287 | B1 * | 9/2014 | Graupner et al. | 718/104 |
| 2001/0037412 | A1 * | 11/2001 | Miloushev et al. | 709/315 |
| 2002/0065864 | A1 * | 5/2002 | Hartsell et al. | 709/100 |
| 2002/0073242 | A1 * | 6/2002 | Peloquin et al. | 709/313 |
| 2002/0087611 | A1 * | 7/2002 | Tanaka et al. | 709/1 |
| 2003/0055931 | A1 * | 3/2003 | Cravo De Almeida et al. | 709/223 |
| 2003/0110312 | A1 * | 6/2003 | Gunduc et al. | 709/328 |
| 2003/0145035 | A1 * | 7/2003 | de Bonet | 709/102 |
| 2003/0200061 | A1 * | 10/2003 | Yamanaka et al. | 702/188 |
| 2003/0200080 | A1 * | 10/2003 | Galanes et al. | 704/200 |
| 2004/0073782 | A1 * | 4/2004 | Price et al. | 713/1 |
| 2004/0109410 | A1 * | 6/2004 | Chase et al. | 370/229 |
| 2004/0221261 | A1 * | 11/2004 | Blevins | 717/107 |
| 2005/0160428 | A1 * | 7/2005 | Ayachitula et al. | 718/104 |
| 2005/0273518 | A1 * | 12/2005 | Patrick et al. | 709/238 |
| 2006/0036798 | A1 * | 2/2006 | Dickey et al. | 711/100 |
| 2006/0041891 | A1 * | 2/2006 | Aaron | 719/315 |
| 2006/0053128 | A1 * | 3/2006 | Gestrelius et al. | 707/101 |
| 2006/0161651 | A1 * | 7/2006 | Ardulov et al. | 709/224 |
| 2006/0181540 | A1 * | 8/2006 | Loo | 345/551 |

(Continued)

FOREIGN PATENT DOCUMENTS

WO    WO02101493    12/2002

*Primary Examiner* — Emerson Piente
*Assistant Examiner* — Mehran Kamran
(74) *Attorney, Agent, or Firm* — Henry Gabryjelski; Kate Drakos; Micky Minhas

(57) ABSTRACT

In client-server architectures, systems and methods for implementing an extensible resource management platform at a server are described. The extensible resource management platform is developed based on a plug-in based architecture which includes one or more subsystems for performing functions associated with resource management. Different implementations can be provided by new or different components or plug-ins. The resource management platform is thus a platform over which one or more functionalities can be further added to supplement existing and varying functions.

20 Claims, 5 Drawing Sheets

(56) References Cited

U.S. PATENT DOCUMENTS

| | | | |
|---|---|---|---|
| 2006/0236368 A1* | 10/2006 | Raja et al. | 726/1 |
| 2006/0288401 A1* | 12/2006 | Wilson | 726/1 |
| 2007/0006165 A1* | 1/2007 | Lam et al. | 717/128 |
| 2007/0043759 A1* | 2/2007 | Bodin et al. | 707/102 |
| 2007/0061712 A1* | 3/2007 | Bodin et al. | 715/523 |
| 2007/0100628 A1* | 5/2007 | Bodin et al. | 704/261 |
| 2007/0156813 A1* | 7/2007 | Galvez et al. | 709/204 |
| 2007/0162855 A1* | 7/2007 | Hawk et al. | 715/730 |
| 2007/0165538 A1* | 7/2007 | Bodin et al. | 370/254 |
| 2007/0169125 A1* | 7/2007 | Qin | 718/102 |
| 2007/0180444 A1* | 8/2007 | Hoover et al. | 717/168 |
| 2007/0299964 A1* | 12/2007 | Wong et al. | 709/224 |
| 2008/0034375 A1* | 2/2008 | Ferrell | 719/314 |
| 2008/0294648 A1* | 11/2008 | Lin et al. | 707/10 |

* cited by examiner

RESOURCE MANAGEMENT PLATFORM

BACKGROUND

Currently available computing-based devices allow plurality of processes to run on them. One or more applications may also be hosted on such devices that allow access by other users connected to them. Such processes and applications use resources (e.g., memory and processors), of the host computing based devices. Resource management tools allow a system administrator to manage resources that are allotted to the processes or applications. Allocation of resources to applications can be done on the discretion of the system administrator or can be dictated through a policy for managing resources. An example of such an application includes Windows® System Resource Manager (WSRM) developed by the Microsoft® Corporation.

Presently existing resource management tools are application based and are rigid. Systems today are complex, serve a spectrum of needs and thus have varying requirements. Resource management tools may have to be modified from time to time to cater to the developing needs. Unfortunately, modifying resource management tools is a code extensive task.

SUMMARY

This summary is provided to introduce concepts for implementing a resource management application based on an extensible resource management platform. These concepts are further described below in the detailed description. This summary is not intended to identify essential features of the claimed subject matter, nor is it intended for use in determining the scope of the claimed subject matter.

In an embodiment, a resource management platform provides a resource manager that interacts with a system supported by the resource management platform. A condition engine performs tasks based on set conditions associated with the management platform. An accounting engine may monitor resource utilization of the system. Furthermore, the accounting engine may record snapshots of resource utilization of the system. This data can be consumed to report the same later. A configuration store may track plug-ins that are used to extend the management platform.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for implementing an extensible resource management platform are described. The resource management platform is developed on a plug-in based architecture which includes one or more subsystems for performing basic functions associated with resource management. The entire resource management platform is thus a platform over which one or more functionalities can be further added to supplement existing functions. This results in the resource management tool to be extensible to a user's requirements.

Additional implementations can be made through add-on components or plug-ins. In this way no modifications are made to the core code of the resource management platform, preventing any discrepancies in functioning when new features are added. It is noted that any implementation over the platform could result in an application for resource management. The resulting application could be capable of performing functions associated with the plug-ins. Hence functionalities of the resource management application could depend on the type or nature of implementations made over the platform.

To implement resource management, an agent within the platform manages one or more subsystems or engines that perform tasks associated with resource management. Examples of such tasks include, but are not limited to, accounting, implementing and updating policies, etc. As indicated previously, specific functionalities can be implemented through plug-ins. The agent manages the interactions between the engines and the respective plug-ins implementing additional functionalities. In turn, the plug-ins provide one or more engines with specific information, for example, the database for which accounting has to be performed, policy to be implemented for which user, time period for which the accounting is to be performed, etc.

When the resource management platform has to be implemented, the agent binds all the components (e.g., the engines and the plug-ins) into one structure for performing resource management. The entire structure behaves as a resource management application, the functions of which are defined by the plug-ins associated with the platform. Further functionalities can be added by supplementing the structure with additional plug-ins.

While aspects of described systems and methods relating to a resource management platform can be implemented in any number of different computing systems, environments, and/or configurations, embodiments of system analysis and management are described in the context of the following exemplary system architecture(s).

An Exemplary Architecture

Figure 1:
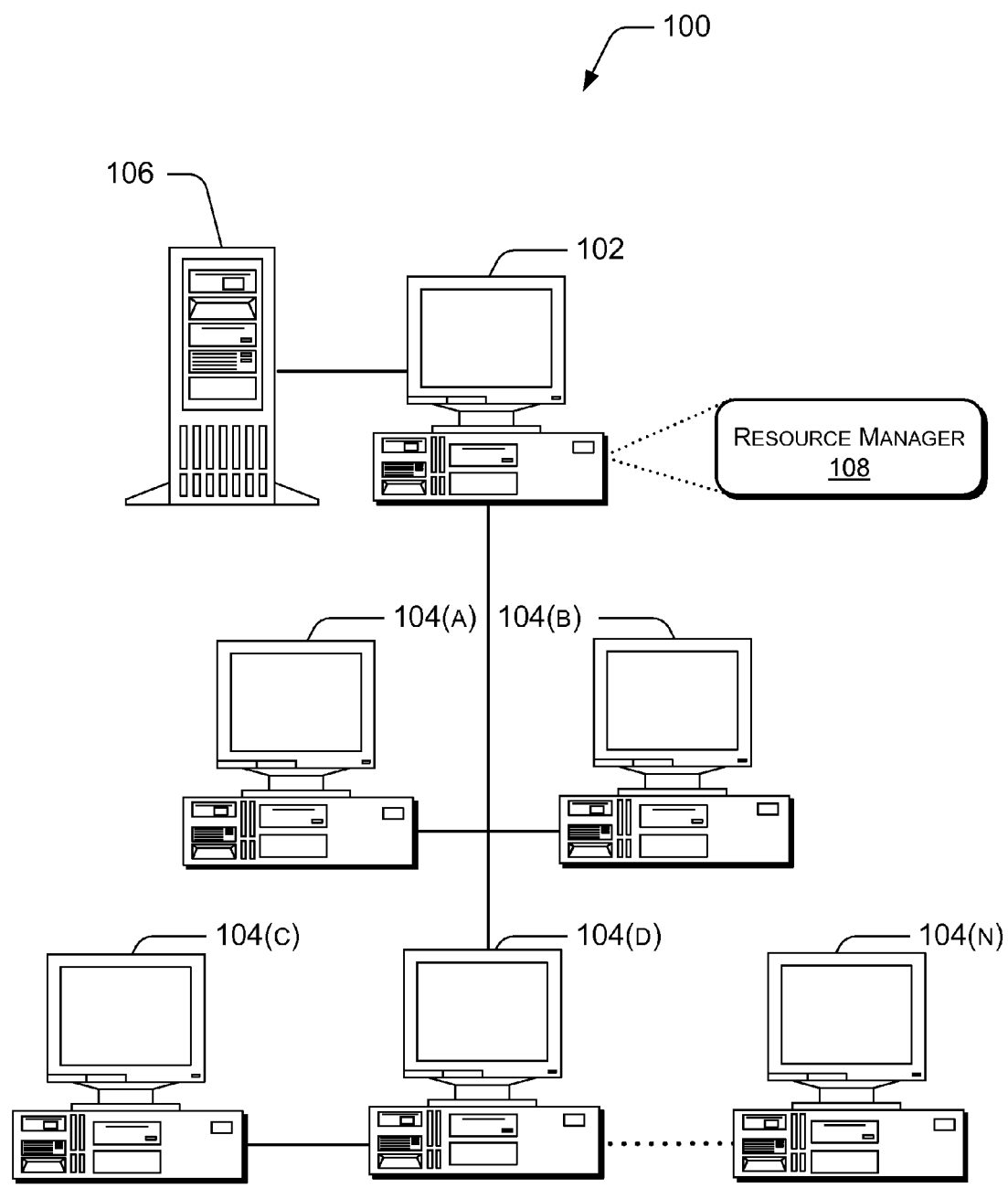
FIG. 1 illustrates an exemplary architecture for implementing a resource management application.

FIG. 1 illustrates an exemplary computer system 100 implementing a resource management platform. Computer system 100 includes a server computing device 102, other computing-based devices 104(A)-(N), and a collection server 106. Server computing device 102, computing-based devices 104(A)-(N), and collection server 106 can include personal computers (PCs), web servers, email servers, home entertainment devices, game consoles, set top boxes, and other computing-based devices known in the art.

Computer system 100 can include any number of computing-based devices 104(A)-(N). In an implementation, computer system 100 can be a company network, including thousands of office PCs, various servers, and other computing-based devices spread throughout several countries. In another possible implementation, system 100 can include a home network with a limited number of PCs belonging to a single family.

Computing-based devices 104(A)-(N) can be coupled to each other in various combinations through a wired and/or wireless network, including a LAN, WAN, or any other networking technology known in the art.

Server computing device 102 can also include resource manager 108. Resource manager 108 is capable of managing one or more components performing functions related to resource management. As indicated previously, resources may include entities such as memory usage, processor, etc. Furthermore, resources can include entities such as transactions per second (e.g., for particular servers such as SQL), response times, etc. The manner in which the above are implemented by resource manager 108 will be discussed in detail later in the description.

As discussed, resource manager 108 forms a part of a resource management platform implemented on a computing-based device, for example, server computing device 102. Resource management is an important issue while managing applications such as word processing applications, hosted and executed on server computing device 102. For example, the applications when executed upon a request from one or more of computing-based devices 104(A)-(N) utilize resources, (e.g., processor and memory) of server computing device 102. It may be the case that certain processes by a specific user may use more resources than others.

Resource manager 108 works within the resource management platform and interacts with one or more subsystems within the platform for performing resource management. The subsystems or engines provide basic functionality supplemented by plug-ins providing specific functionality. The architecture of resource management platform is explained in further detail in conjunction with FIG. 2.

Resource management allows an individual, such as a system administrator, to monitor and control the resources that are being allotted to application processes for a user. For example, the system administrator can specify the maximum amount of memory that can be utilized by an application (e.g., word processor), or to specific user. In case the word processor application or a user (e.g., one or more of computing-based devices 104), requires more memory, the condition implemented by the system administrator would prevail, allowing memory access that is sufficient in normal course. The resource management application can also monitor the resources being utilized by a specific user. If resources being used exceed a predefined limit, then further resources are prevented from being allotted to the specific user.

In the absence of such conditions, an application or a user may have taken more than the required resources of server computing device 102, inhibiting normal execution of other applications. Resource management applications therefore provide means for keeping a check on the amount of resources being utilized by an application or user. In this manner, only a specific amount of resources can be utilized by application processes, providing more control over how the system responds to such resource requests. Such resource management can be performed using various applications that are available. The applications for performing resource management are implemented by providing additional plug-ins that supplement the basic functionality provided by the core or the resource management platform. Such applications are flexible allowing future development or additions based on user's requirements.

An Exemplary Resource Management Platform

Figure 2:
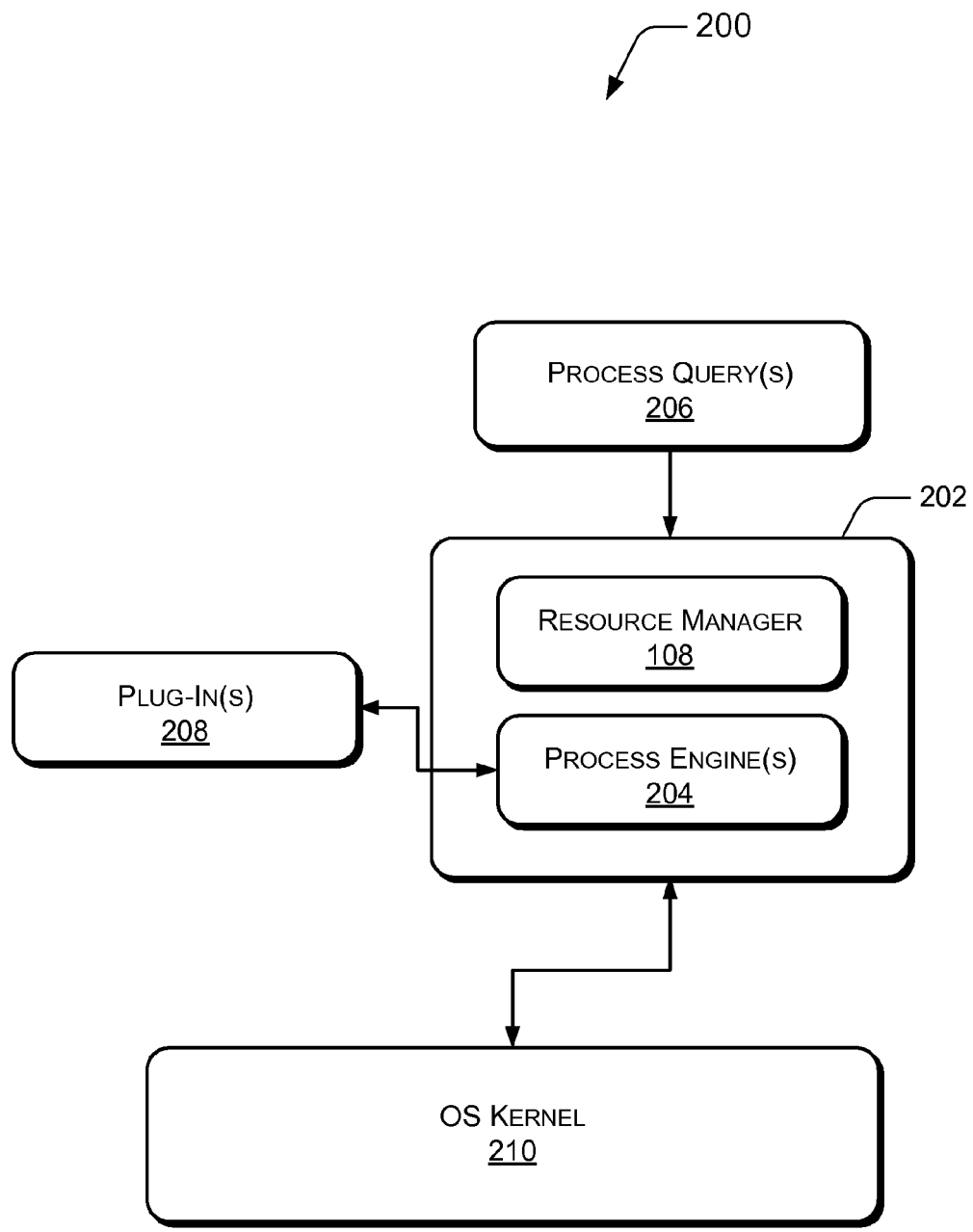
FIG. 2 illustrates components of a resource management application implemented on the basis of a resource management platform.

FIG. 2 illustrates various components of a resource management platform 200. The resource management platform 200 behaves as a platform for implementing resource management and associated services on a computing-based device, for example, server computing device 102.

Resource management platform 200 includes core 202. Core 202 forms a logical platform on which resource manager 108 and one or more components (e.g., process engine(s) 204) are based. Core 202 can be implemented using computer implementable instructions or through hardware. Core 202 also includes instructions that act as interface between core 202 and one or more of process engine(s) 204, and amongst one or more process engine(s) 204.

Process engine(s) 204 may implement functionalities associated with a resource management application. Process engine(s) 204 may include computer implementable instructions to collect process information associated with any process or executing applications. The computer implementable part is abstracted in the process engine(s) 204 and the details are provided by a specific plug-in. For example, there may be a plug-in for Windows® OS and another plug-in for Linux OS. The data is then recorded into local data structures within the process engine(s) 204. The process information is utilized for performing one or more functions associated with resource management. In an implementation, process information is abstracted from process request(s) 206 which is generated when a user wishes to access one or more applications that is hosted on server computing device 102.

Process information can include any data related to or specific to the process which generated the process information. For example, a request for accessing an application, such as a word processing application, hosted on server computing device 102 could include data indicating the user (e.g., one or more of computing-based devices 104), which has generated the request, time of request, intended application to be accessed, and so on.

The process information can be collected by one or more of process engine(s) 204 in core 202. Core or process engine(s) 204 can include an events engine used for performing event based actions, such as updating policies on occurrence of an event, etc. Instances of events that trigger the carrying out of such actions include events like addition of a processor, clustering events, and so on. Furthermore, global events may be added (i.e., plugged in) to trigger the change. Such global events could be generated from devices and conditions outside the particular machine. The event engine would therefore collect process information associated with the process request(s) 206. It would be noted that process information does not include specific information or instructions in relation to what action is to be performed and on the occurrence of which event, is the action to be performed. The specifics of the action to be performed and on occurrence of which event can be additionally implemented through one or more plug-in(s) 208.

Plug-in(s) 208 define the specifics which supplement the associated process engine(s) 204. Information collected by one or more of process engine(s) 204 is passed onto plug-in(s) 208 for further processing. Once information is passed onto plug-in(s) 208, the related processing is carried out which is managed by resource manager 108.

The event engine which is used for performing an event based action, collects relevant process information and passes it onto the respective plug-ins. The plug-in includes information or instructions for performing a specified action on the occurrence of a given event. Resource manager 108 monitors all events that occur henceforth, and performs a specified action on the occurrence of the event as specified in the plug-ins.

In an implementation, another plug-in specifying the execution of a second action on the occurrence of another event can be supplemented with core 202. In this manner, one or more plug-ins can be associated with core 202 making it more extensible. This allows supplementing the functionalities associated with core 202 by adding one or more plug-ins. Moreover, plug-ins can be implemented without modifying the coding associated with core 202. In this way, any undesirable results arising due to a faulty code modification of core 202 can be avoided. It would be noted that once one or more plug-ins are implemented core 202 functions as an application for performing resource management. Furthermore, these concepts are applicable for adding resources.

Once the request 206 has been monitored by resource manager 108, it is forwarded to an operating system or OS kernel 210 for appropriate action. OS kernel 210 manages system resources and communication between hardware and software components, of computing based device on which it is installed, for example, server computing device 102. In an implementation, an OS based plug-in may forward requests to the OS kernel in order to abstract the OS.

Exemplary Implementation of Resource Management Platform

Figure 3:
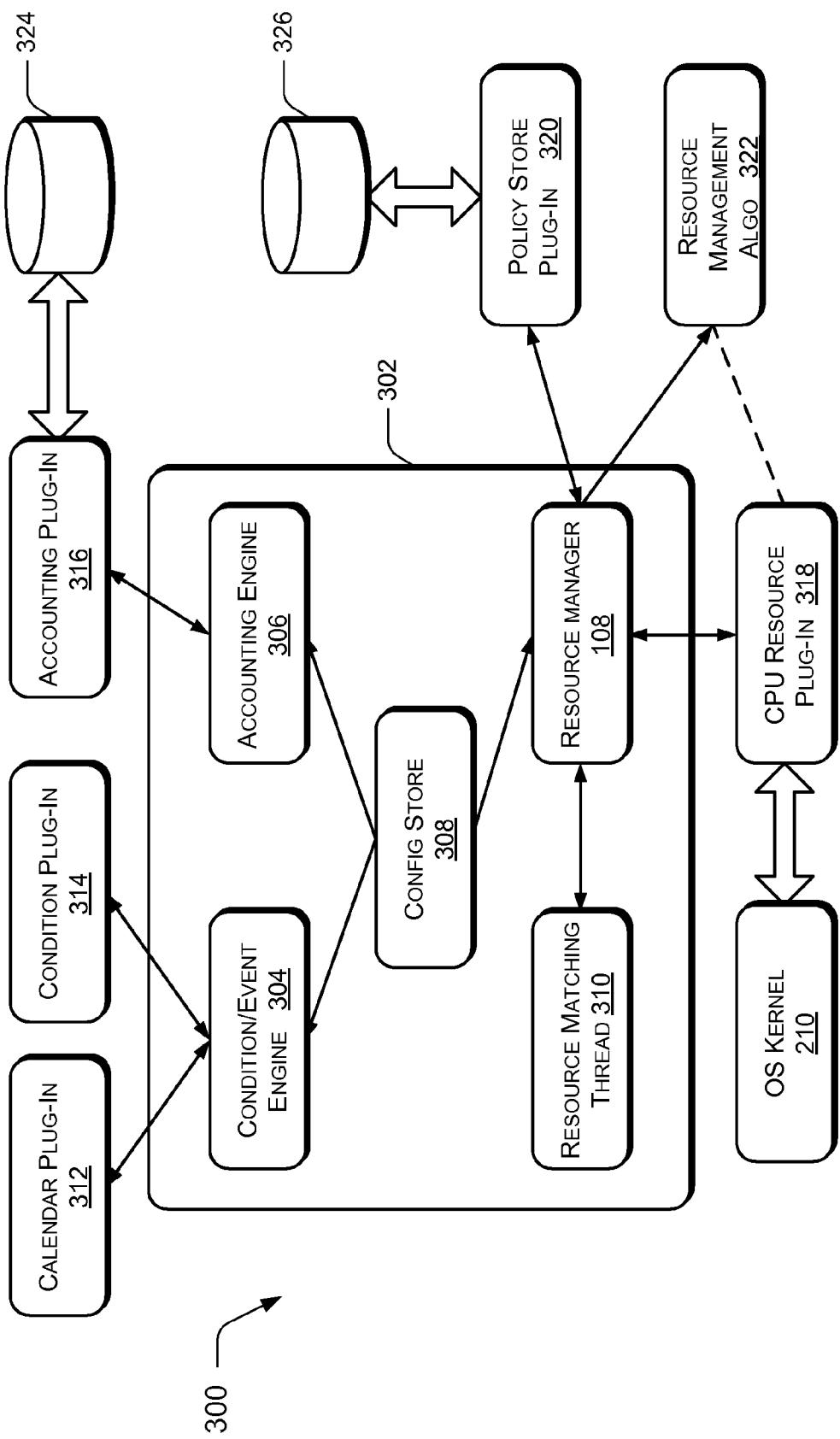
FIG. 3 illustrates an exemplary resource management platform.

FIG. 3 illustrates an exemplary implementation of resource management platform as a resource management application 300 along with its components. The following implementation may be based on Windows System Resource Manager (WSRM) developed by the Microsoft® Corporation.

The implementation departs from the standard approach of using an application for performing resource management, by breaking the entire application structure into one or more components. These components are not intrinsically dependent on the main code but can supplement the main code or a platform (e.g., resource management platform 200) and can be associated with it as plug-ins. Hence any additional functionality is added by adding a plug-in as per the requirement. It is noted that any implementation over the platform would result in an application that is tailored as per the user or client needs. This allows users and third party vendors to implement customized solutions with the platform that are more suitable for their needs.

As illustrated in FIG. 3, some of the components include the process engines, like process engine(s) 204 in core 202 and plug-in(s) 208. Some of process engine(s) 204 that have been illustrated include resource manager 108, condition engine 304, accounting engine 306, configuration or config store 308 and resource matching thread 310. It would be appreciated that one or more process engine(s) 204 may exist in core 202. Of plug-in(s) 208 that are present in resource management application 300, the illustrated ones include calendar plug-in 312, condition plug-in 314, accounting plug-in 316, CPU resource plug-in 318, policy store plug-in 320 and resource management algorithm (algo) 322.

Resource management platform 300 as illustrated also include databases 324 and 326 for storing the results generated by accounting plug-in 316 and for storing policies, respectively. It is to be understood that the databases 324 and 326 can include relational databases, and plain and simple files. The stored policies are used for instrumenting polices that are implemented on a system in consideration, for example server computing device 102. The components are further described in detail in the following description.

Condition Engine 304

Condition or event (condition/event) engine 304 can interchangeably be referred to as either a condition or an event engine. The difference that exists between the functionality of a condition and an event engine is the plurality of plug-ins that are associated with them. As indicated previously, engines, such as process engine(s) 204, include basic information for performing of one or more resource management functions. The specifics are provided by one or more plug-in(s) 208. Condition/event engine 304 will therefore function as a condition engine if it is deriving its specifics from condition plug-in 314. This implies that condition/event engine 304 could perform certain actions on the fulfillment of certain conditions provided by condition plug-in 314. For example, condition engine 304 could perform condition based tasks, like regulating memory allocation, on occurrence of certain condition. Such conditions could be the number of users accessing the system exceeds a predefined limit, a privileged user logging on, etc.

In addition, condition engine 304, performs event driven actions when its specifics are being provided by calendar plug-in 312. In such a case, condition engine 304, which is now behaving as an event engine 304, automatically performs tasks at regulated intervals. For example, condition engine 304 can automatically perform event based tasks, such as updating policies in policy store 326, on occurrence of certain events processor addition, cluster events or a time based event.

For example, to cluster events a plug-in can be implemented as an extension of condition engine 304. The process for implementing a cluster event plug-in would include writing the plug-in as per the user requirement. The plug-in is then registered with config store 308 and initialized with appropriate parameters from config store 308. It periodically interacts with condition engine 304 to notify about the changes required in condition engine 304, if any.

As soon as the cluster event plug-in intercepts a cluster event it informs condition engine through a one or more interfaces. The interception of such cluster events result in changes in state of a system intercepting cluster events.

Accounting Engine 306

Accounting engine 306 monitors the resource utilization occurring on a system (e.g., server computing device 102). Accounting engine 306 includes only basic information that defines its function. The specifics associated with the process of accounting are provided by accounting plug-in 316. Accounting plug-in 316 defines one or more parameters for accounting. Such parameters may include information in relation to a database that is to be accounted for, a user set for which the accounting record is to be prepared, etc. In some cases, a rate may also be specified in accounting plug-in 316 used to determine the cost that has been incurred by a user accessing applications hosted on server computing device 102.

Records generated by accounting plug-in 316 can be stored in accounting store 324. It is to be appreciated by a person skilled in the art that accounting store 324 can be intrinsically associated with a computing based device on which resource management application 300 is installed or be associated remotely through a network. This allows retrieval of accounting records by an individual (e.g., system administrator), or by users wishing to access their usage.

In addition, accounting engine 306 can also include reader, writer and query components. Each of these components can be implemented along with accounting plug-in 316 as additional plug-ins. These components are also customizable allowing users to write their respective reader plug-in, writer plug-in and their preference query plug-in. These components can also implement adapters for existing reporting and chargeback tools and making them compatible with presently existing resource management tools for example, WSRM developed by the Microsoft® Corporation.

Config Store 308

Config store 308 keeps a track of all plug-in(s) 208 that are incorporated within resource management application 300. Config store 308 also provides a mechanism for allowing the installation of new plug-ins and the uninstallation of old or unused plug-ins. Config store 308 continuously interacts with all process engine(s) 204 and initiates any updating of plug-ins based on interactions of process engine(s) 204 and their respective plug-in(s) 208.

Policy Store 320

Policy store 320 stores one or more policies that are implemented on a system (e.g., server computing device 102). The policies in policy store 320 can be implemented by a system administrator for regulating resource management process on one or more of computing based device.

The policies in policy store 320 can be defined in a relational manner or can be role-based. Defining policies allows resources to be allotted or managed on the basis of the policies defined. For example, as per the defined policies some users may be allowed use of resources in an unrestricted manner while others may only be allowed resource access in a restricted manner, allowing only certain number of users access to one or more specific applications, etc. In this manner, polices can be utilized for effectively implementing resource management processes and related applications.

Resource Management Algorithm 322

Resource management algorithm 322 defines one or more processes that define the resource management process followed by resource manager 108. Resource manager 108 interacts with resource management algorithm 322. It would be appreciated that resource management algorithm 322 is implemented as one or more plug-ins that can be developed by third party vendors. Implementing resource management algorithm 322 as plug-ins enable minimum or no change to the code associated with core 202.

In one implementation, resource management algorithm 322 interacts with CPU resource plug-in 318 to manage the CPU utilization in a system, for example server computing device 102. The result generated as a result of the execution of process engine, for example, condition engine 304, accounting engine 306, and their respective plug-ins, such as calendar plug-in 312, is then passed onto OS kernel 210 for performing appropriate actions. For example, OS kernel 210, based on the processing by resource manager 108 or CPU resource plug-in 318, manages the allocation of resources to one or more processes or application hosted on a system (e.g., server computing device 102).

Exemplary Server

Figure 4:
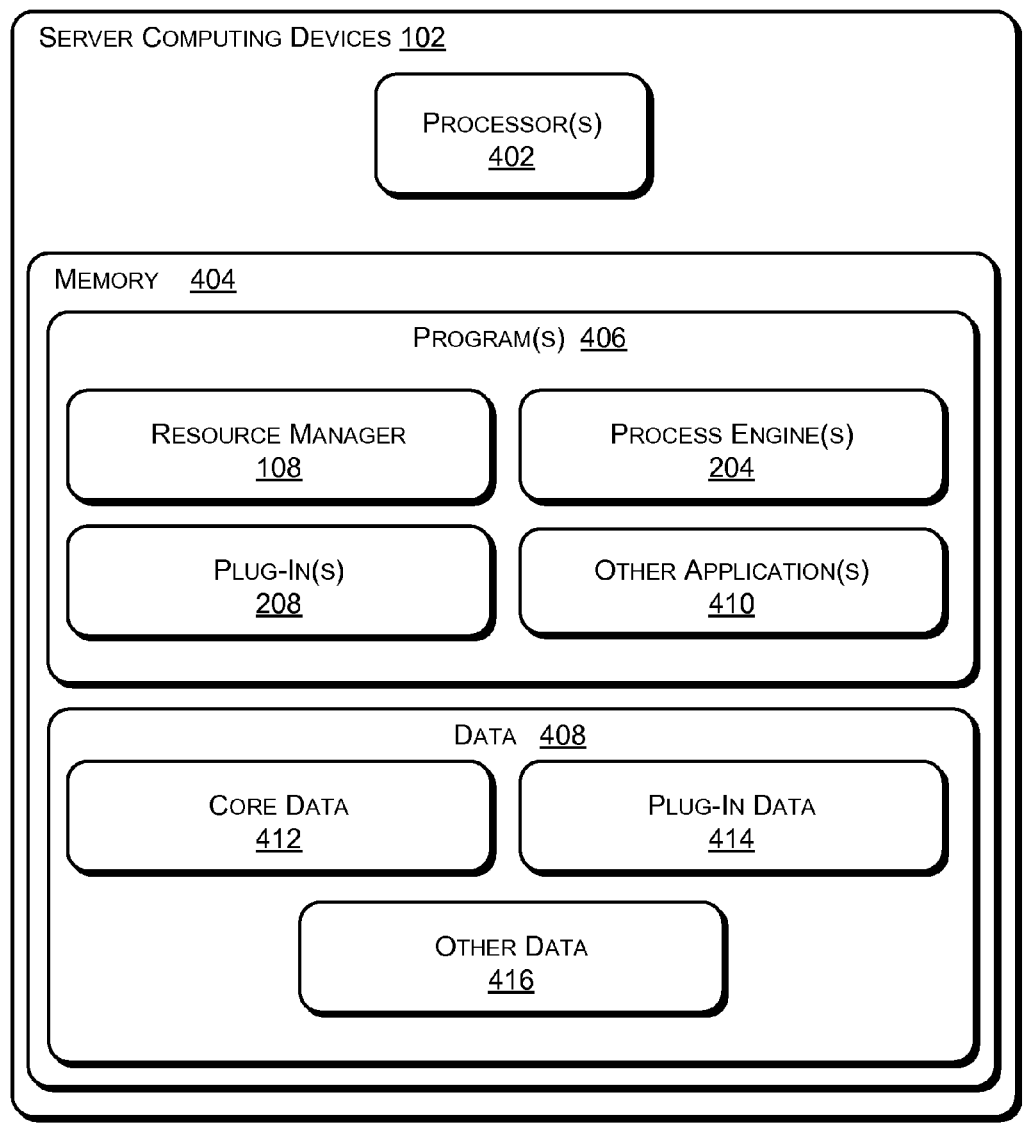
FIG. 4 illustrates an exemplary server-based computing device.

FIG. 4 illustrates relevant exemplary components of server computing device 102. Server computing device 102 can include one or more processor(s) 402 and a memory 404. Processor(s) 402 may include microprocessors, microcomputers, microcontrollers, digital signal processors, central processing units, state machines, logic circuitries, and/or any devices that manipulate signals based on operational instructions. Among other capabilities, processor(s) 402 are configured to fetch and execute computer-readable instructions stored in memory 404.

Memory 404 can include any computer-readable medium known in the art including, for example, volatile memory (e.g., RAM) and/or non-volatile memory (e.g., flash, etc.). As illustrated in FIG. 4, memory 404 also can include program(s) 406 and data 408. Program(s) 406 include, for example, resource manager 108, process engine(s) 204, plug-in(s) 208 and other application(s) 410. Other application(s) 410 include programs that supplement applications on any computing based device such as process receiving applications, update applications, and such. Data 408 include, for example, core data 412, plug-in data 414 and other data 416.

Core data 412 includes information associated with core 202. This information may be instructions that implement one or more functionalities for performing resource management or can be instructions providing means for interactions between resource manager 108 and one or more process engine(s) 204.

As indicated previously, core 202 forms a base for resource manager 108 and one or more of process engine(s) 204. Process engine(s) 204 implement functionalities for performing resource management. Process engine(s) 204 include computer implementable instructions to collect process information associated with any process or executing applications. In one implementation, process information can be stored in other data 416.

Process information includes any data that is related to or that is specific to the process which generated the process information. For example, a request for accessing an application (e.g., a word processing application), hosted on server computing device 102 would include data indicating the user which has generated the request, time of request, intended application to be accessed, etc.

Resource manager 108 utilizes the process information for performing one or more functions associated with resource management. In one implementation, one or more process engine(s) 204 abstracts process information from process request(s) 206. Process request(s) 206 is generated when a user wishes to access one or more applications that may be hosted on a computing based device, for example, server computing device 102.

Process engine(s) 204 abstracts process information from process request(s) 206 and forwards the process information to one or more plug-in(s) 208. As indicated previously, process engine(s) 204 include basic information in relation to the tasks of resource management. For example, process engine(s) 204 associated with the task of accounting will have basic information about how to perform the accounting process; however, it does not include information in relation to the user for whom the accounting is to be done, for which period, etc.

Specific information for implementing one or more functionalities is achieved through plug-in(s) 208. Plug-in(s) 208 define the specifics which supplement process engine(s) 204. Information collected by one or more of process engine(s) 204 is passed onto plug-in(s) 208 for further processing.

For example, an accounting process engine is meant for performing one or more accounting operations for a specific user. Information about the user and other necessary information is however not available to the accounting engine. An accounting plug-in, when supplemented to core 202 would provide the necessary information in relation to the accounting to be performed. Such information may relate to the one or more users for which the accounting is to be done, time for which the account is to be generated, and so on. In this way, one or more plug-in(s) 208 can be implemented with the respective process engine(s) 204. This allows adding more functionality without making any modifications to instructions associated with core 202. Hence the procedure for implementing additional functionalities is less code extensive and extensible.

Once information is passed onto plug-in(s) 208, the related processing is carried out which is managed by resource manager 108. The processing performed is based on information included in plug-in(s) 208. In one implementation, plug-in(s) 208 information can be stored in plug-in data 414.

Returning to our example of the accounting engine, the accounting plug-in performs the functions of accounting based on the specific information included in the plug-in. For performing accounting in a manner different from a current accounting mechanism, new or different plug-ins can be added.

It is noted that in the present case, one or more process engine(s) 204 perform their respective functions irrespective of the plug-in(s) 208. In other words, a given process engine(s) 204 will perform a function as long as a respective plug-in(s) 208 is also present.

The result generated as a result of the execution of process engine(s) 204 and their respective plug-in(s) 208, is then passed on to OS kernel 210 for taking appropriate actions. These acts are dictated by the choice of plug-in(s) 208 implemented with core 202. For example, OS kernel 210, based on the processing by resource manager 108, allows or disallows the execution of one or more processes or application or in cases curtails the allocation of resource to certain processes, applications, or users.

Exemplary Method(s)

Exemplary methods for implementing resource management using a resource management platform are described with reference to FIGS. 1, 2 and 3. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
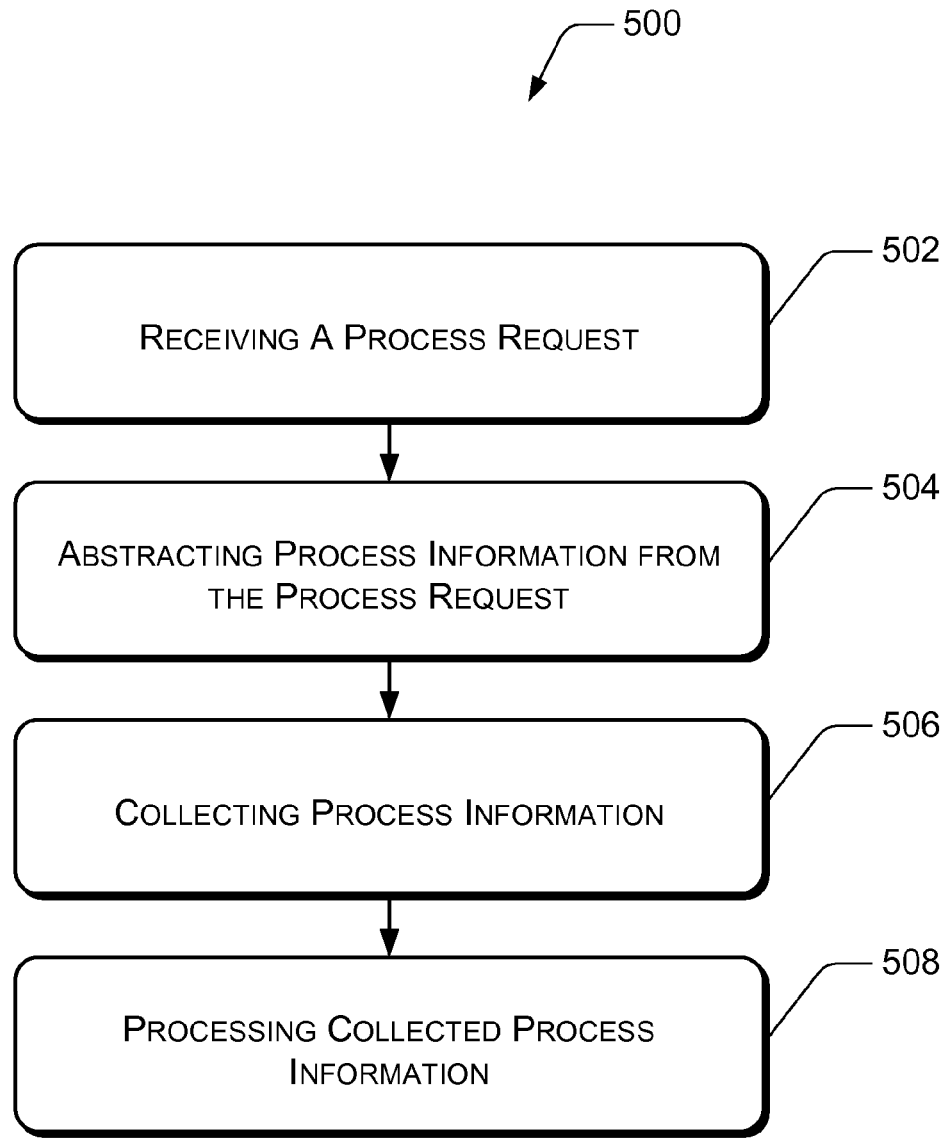
FIG. 5 illustrates exemplary method(s) for implementing resource management platform.

FIG. 5 illustrates an exemplary method 500 being implemented by a resource management application realized from a resource management platform on a computing-based device, such as server computing device 102.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, a process request is received. For example, process request(s) 206 is generated by an access request by a user, such as one or more of computing-based devices 10, and received by a computing based device, like server computing device 102. Server computing device 102 hosts a plurality of applications that are likely to be accessed by one or more of computing-based devices 104. In one implementation, process request(s) 206 also includes process information associated with it. The process information may include any data related or that is specific to the process which generated the process information. For example, a request for accessing an application, like a word processing application, hosted on server computing device 102 would include data indicating the user which has generated the request, time of request, intended application to be accessed, etc.

At block 504, process information associated with one or more process request(s) 206 is abstracted. For example, one or more process engine(s) 204 abstracts process information from process request(s) 206.

At block 506, the abstracted process information is collected and stored for retrieval by one or more modules of server computing device 102. In one implementation, the abstracted process information is stored in other data 416 by one or more of process engine(s) 204. Process engine(s) 204 include basic information in relation to the tasks of resource management. For example, process engine(s) 204 associated with the task of accounting, includes updating and can have basic information about how to perform the accounting process and updating process respectively. The process engine(s) do not necessarily include information in relation to which user the accounting or updating is to be performed upon, for which period, etc.

At block 508, process information collected by process engine(s) 204 is forwarded to plug-in(s) 208 for processing. Specific information for implementing one or more functionalities is achieved through plug-in(s) 208. It is to be appreciated that plug-in(s) 208 define the relevant information for the functioning of process engine(s) 204. For example, processing performed may be based on information included in plug-in(s) 208. In case of an accounting engine, an associated plug-in would carry the necessary information that would be required by the accounting engine to perform the accounting process. In an implementation, plug-in(s) 208 information can be stored in plug-in data 414.

CONCLUSION

Although embodiments for implementing a resource management application from an extensible resource management platform have been described in language specific to structural features and/or methods, it is to be understood that the subject of the appended claims is not necessarily limited to the specific features or methods described. Rather, the specific features and methods are disclosed as exemplary implementations for providing a resource management application based on an extensible resource management platform.

What is claimed is:

1. A computing system comprising:
   one or more processors;
   memory; and
   one or more programming modules stored on the memory and executable by the one or more processors to:
   execute one or more application instances on behalf of one or more users;
   implement a policy store that stores one or more policies for managing allocation of resources;
   implement a configuration store that registers and initializes one or more plug-ins with parameters stored in the configuration store;
   implement a process engine configured to interact with a condition plug-in of the one or more plug-ins to implement a condition engine that determines memory allocation for at least one of the one or more application instances in response to a number of users accessing the computing system exceeding a predefined threshold, the condition plug-in indicating the predefined threshold;
   receive results of the memory allocation determined by the condition engine; and
   allocate memory resources to the one or more application instances based at least in part in response to the results.

2. The computing system of claim 1, wherein the one or more programming modules are further executable by the one or more processors to cause the computing system to perform related processing from the condition plug-in.

3. The computing system of claim 1, wherein the condition engine receives specific information describing the predefined threshold from the condition plug-in.

4. The computing system of claim 1, wherein the process engine is further configured to interact with a calendar plug-in to implement an event engine configured to perform one or more event-driven resource allocation tasks.

5. The computing system of claim 1, wherein the one or more programming modules are further executable by the one or more processors to cause the computing system to implement an accounting engine configured to interact with an accounting plug-in that defines one or more other parameters for accounting of use of the one or more application instances by the one or more users.

6. The computing system of claim 5, wherein the one or more other parameters for accounting include one or more of information as to a database for which use is to be accounted for, or an indication of at least one of the one or more users for which an accounting record is to be prepared.

7. The computing system of claim 1, wherein the one or more programming modules are further executable by the one or more processors to cause the computing system to provide a mechanism for allowing installation of additional plug-ins and uninstallation of previously installed plug-ins.

8. The computing system of claim 5, wherein the one or more other parameters for accounting include one or more of information as to a rate to be used to determine a cost incurred for the use of the one or more application instances.

9. The computing system of claim 1, wherein the one or more policies defines at least one of the one or more users that are allowed unrestricted allocation of resources.

10. The computing system of claim 1, wherein the process engine is further configured to perform an update to one of the one or more policies within the policy store in response to an addition of resources to the system resources, the one or more programming modules further executable by the one or more processors to allocate memory resources to the one or more application instances further based at least in part on the one of the one or more policies.

11. A server comprising:
memory;
one or more processors operatively coupled to the memory; and
a plurality of programming instructions stored in the memory, wherein the plurality of programming instructions are configured to cause the one or more processors to implement:
one or more application instances hosted on behalf of one or more user devices;
a first process engine configured to interact with a plug-in to implement an event engine that performs an update of a policy within a policy store in response to an addition of resources to a plurality of computing system resources specified by the plug-in, the policy providing computing system resource allocation for the one or more application instances;
an operating system kernel configured to receive results of the update of the policy within the policy store and to allocate portions of the plurality of computing system resources to the one or more application instances based on the results; and
a second process engine configured to interact with an accounting plug-in to implement an accounting engine configured to interactively perform accounting operations for a user, the accounting plug-in including parameters for accounting including specifics regarding accessing the one or more application instances by the user.

12. The server of claim 11, wherein the first process engine is further configured to abstract information from a request for one of the one or more application instances on the server to generate abstracted information, the abstracted information including one or more time-based events.

13. The server of claim 12, wherein the first process engine is further configured to forward the abstracted information to the plug-in.

14. The server of claim 11, wherein the first process engine is further configured to interact with a cluster event plug-in to implement the event engine, the event engine further performing a change in state of a system receiving a cluster event defined by the cluster event plug-in.

15. The server of claim 11, further comprising data stored on the memory that includes one or more of core data and plug-in data.

16. The server of claim 11, wherein the event engine also performs one or more tasks on regular intervals, the one or more tasks and the regular intervals specified by the plug-in.

17. A method comprising:
executing, by a computing system, one or more application instances on behalf of one or more users;
implementing a policy store that stores one or more policies for managing allocation of computing system resources;
implementing a configuration store that registers and initializes one or more plug-ins with parameters stored in the configuration store;
implementing a process engine configured to interact with a condition plug-in of the one or more plug-ins to implement a condition engine that determines memory allocation for at least one of the one or more application instances in response to a number of users accessing the computing system exceeding a predefined threshold, the condition plug-in indicating the predefined threshold;
receiving results of the memory allocation determined by the condition engine; and
allocating memory resources to the one or more application instances based at least in part in response to the results.

18. The method of claim 17, further comprising interacting with another plug-in to implement an event engine configured to perform one or more event-driven resource allocation tasks.

19. The method of claim 17, further comprising performing an update to one of the one or more policies within the policy store in response to an addition of resources to the computing system resources, the allocating memory resources to the one or more application instances further based at least in part on the one of the one or more policies.

20. The method of claim 17, wherein the one or more policies defines at least one of the one or more users that are allowed unrestricted allocation of resources.

* * * * *